United States Patent
Cross et al.

[11] Patent Number: 5,864,609
[45] Date of Patent: Jan. 26, 1999

[54] METHOD FOR ESTABLISHING CUSTOMIZED BILLING ARRANGEMENTS FOR A CALLING CARD IN A TELECOMMUNICATIONS NETWORK

[75] Inventors: Wanda Kay Cross, Lynn Center, Ill.; Michael Joseph Haller, Summit, N.J.; Brian John Higgins, New Providence, N.J.; Nasrin Hoque, Mapawan, N.J.; Kathryn Ann Jurie, Stanhope, N.J.; Dianne Green Russell, Reynoldsburg, Ohio

[73] Assignee: AT&T Corp., Middletown, N.J.

[21] Appl. No.: 526,794

[22] Filed: Sep. 11, 1995

[51] Int. Cl.[6] .................................................. H04M 15/00
[52] U.S. Cl. ...................... 379/115; 379/91.01; 379/112; 379/144; 379/121
[58] Field of Search ........................... 379/114–115, 144, 379/155, 143, 130–132, 91.1, 121

[56] References Cited

U.S. PATENT DOCUMENTS

| | | | |
|---|---|---|---|
| 5,046,183 | 9/1991 | Dorst et al. | 370/110.1 |
| 5,481,600 | 1/1996 | Alesio | 379/114 |
| 5,677,945 | 10/1997 | Mullins et al. | 379/114 |

*Primary Examiner*—Curtis A. Kuntz
*Assistant Examiner*—Duc Nguyen

[57] ABSTRACT

A method for automatically converting a promotional calling card to a permanent calling card by an operator services system (OSS) is disclosed. A promotional calling card call received in the OSS is validated by obtaining card product-type data and card information data from a calling card validation database. Upon depletion of a non-billed promotional balance, the caller using a promotional calling card is presented with the option of being connected to a customer services representative by the OSS for arranging billing for future use of the card. User convenience is enhanced since the promotional calling card number is also used as the permanent calling card number after billing arrangements are made via the customer service representative.

9 Claims, 5 Drawing Sheets

FIG. 5A

| CALLING CARD NUMBER | CARD TYPE | CARD INFORMATION |
|---|---|---|
| 1 | A | REMAINING BALANCE = $0.00<br>BALANCE DEPLETION PROTOCOL = BILL TO "708-555-1234" |
| 2 | B | REMAINING BALANCE = $5.00<br>BALANCE DEPLETION PROTOCOL = DISCONNECT |
| 3 | C | BILL ALL CALLS TO DIRECTORY NUMBER 708-555-6457 |

FIG. 5B

| CARD TYPE | ANNOUNCEMENT PROTOCOL |
|---|---|
| A | FIRST ANNOUNCEMENT: PROVIDE MAXIMUM CALL DURATION; REMAINING BALANCE; AND BALANCE DEPLETION PROTOCOL.<br>SECOND ANNOUNCEMENT: ALERT TONE: WARNING THAT PAYMENT ACCOUNT WILL BE BILLED TO DIRECTORY NUMBER ACCOUNT AFTER 30 SECONDS. |
| B | FIRST ANNOUNCEMENT PROVIDES: MAXIMUM CALL DURATION: REMAINING BALANCE; AND BALANCE DEPLETION PROTOCOL;<br>SECOND ANNOUNCEMENT: ALERT TONE. WARNING OF IMPENDING DISCONNECT AND OFFER TO CONNECT TO CUSTOMER REPRESENTATIVE |
| C | ANNOUNCEMENT TO PROMPT CALLER FOR CALLING CARD NUMBER |

METHOD FOR ESTABLISHING CUSTOMIZED BILLING ARRANGEMENTS FOR A CALLING CARD IN A TELECOMMUNICATIONS NETWORK

TECHNICAL FIELD

This invention relates to the field of telecommunications networks and, more particularly, to a method for automatically updating billing arrangements and issuing customized announcements during a calling card call in such telecommunications networks.

BACKGROUND OF THE INVENTION

The U.S. telecommunications industry is evolving in anticipation of rigorous competition for market share in local and long distance services. It is competition, and the expectations of the modern day consumer, that drive telecommunications companies to quickly bring to market those products and services which provide competitive pricing, quality service and convenience. One example of such a service is the now familiar "calling card" which allows a subscriber to place toll calls while away from the home or office without having to bill the call to a third party, or to continually insert coins into a public telephone. For example, a typical calling and/or credit card, such as the AT&T Universal card, enables a user to dial a directory number of a called party and a calling card number to place a call. Upon validation of the dialed calling card number by an operator services system (OSS), a connection between the subscriber and the called party is established. The calling card subscriber subsequently pays for the telephone call, and all other calls placed during a predetermined period, upon receiving an itemized calling card bill.

To introduce and encourage the use of calling card services, companies commonly distribute "promotional" calling cards at community events or via bulk mailings. A promotional card carries a pre-established non-billed balance which enables a user to place free telephone calls using the number printed on the face of the card until the non-billed balance is depleted. This trial use of a calling card is designed to convince potential customers of the ease-of-use and security associated with calling card service. Once the balance is depleted, the user disposes of the card and, if he or she desires, contacts the issuing company for a permanent calling card. Since promotional cards are distributed in a random fashion, it is not possible to issue a customized calling card number, such as a number which is based on the home directory number of the user.

Promotional calling cards do not allow billing and thus, are issued with predefined numbers (e.g. all promotional card numbers may start with the digits "898") which signifies to the OSS that the card is for promotional purposes, and that a billing record should not be generated for calls placed using the card. Permanent (or "unlimited use") calling card calls, however, are normally billed to a subscriber-specified directory number (e.g. a home or business directory number). Although some permanent card subscribers use a directory number as a portion of their calling card number, other subscribers choose to use a company assigned number for security reasons. Regardless of the card number chosen by a subscriber, permanent calling card numbers are always distinguishable from promotional calling card numbers so that the network can properly bill calls.

Although promotional calling cards are a valuable vehicle for introducing calling card service, users of the cards who become accustomed to a particular promotional card number are inconvenienced when, upon electing to subscribe to a permanent calling card, a new card number is assigned. In the current system, a new card number must be assigned due to card numbering rigidity which is imposed for proper billing. Thus, a promotional calling card user cannot extend use of the card after the initial non-billed balance has been depleted. Since ease-of-use is the hallmark of any calling card service, inconveniences associated with calling card use may result in a loss of market share for the card-issuing company. Therefore, there is a need in the art for flexibility in a telecommunications network so that promotional calling cards can be converted to permanent calling cards.

SUMMARY OF THE INVENTION

This need is addressed and a technological advance is achieved in the telecommunications art by the method and system of the present invention which enables a operator services system (OSS) in a telecommunications network to accommodate calling cards with customized billing accounts, and issue announcements in accordance with the customized billing.

In the preferred embodiment of the system of the present invention, an OSS includes an internal database for storing announcements, and is interconnected to a card validation database, a rating database, a billing system, a customer services switch. In accordance with an exemplary embodiment of the method of the present invention, a calling card call is received in the OSS. The OSS uses the calling card number received from the caller to access the card validation database for determining the card type and card information relating to received calling card number. Once the card type and information is received, the OSS accesses the rating database (if necessary) to determine a maximum call duration. The caller is then notified of the maximum call duration and balance depletion protocol. Prior to balance depletion, the OSS interrupts the call with a customized warning announcement. For example, if a caller using a promotional calling card may notified 30 seconds prior to actual termination that the call will be automatically disconnected at the end of that time in accordance with the existing balance depletion protocol. The caller is also advised, however, that use of the card may be continued by converting the promotional card to a permanent card. If the caller so indicates, the OSS connects the caller to a customer representative to arrange billing. Once the card information is updated in the card validation database, future calls can be completed using the calling card number originally issued for the promotional calling card in accordance with an updated protocol.

BRIEF DESCRIPTION OF THE DRAWINGS

FIG. 5A is a representation of card data stored in the calling card validation database of FIG. 1.

FIG. 5B is a representation of announcement protocol data stored in the internal database of FIG. 1.

DETAILED DESCRIPTION

Figure 1:
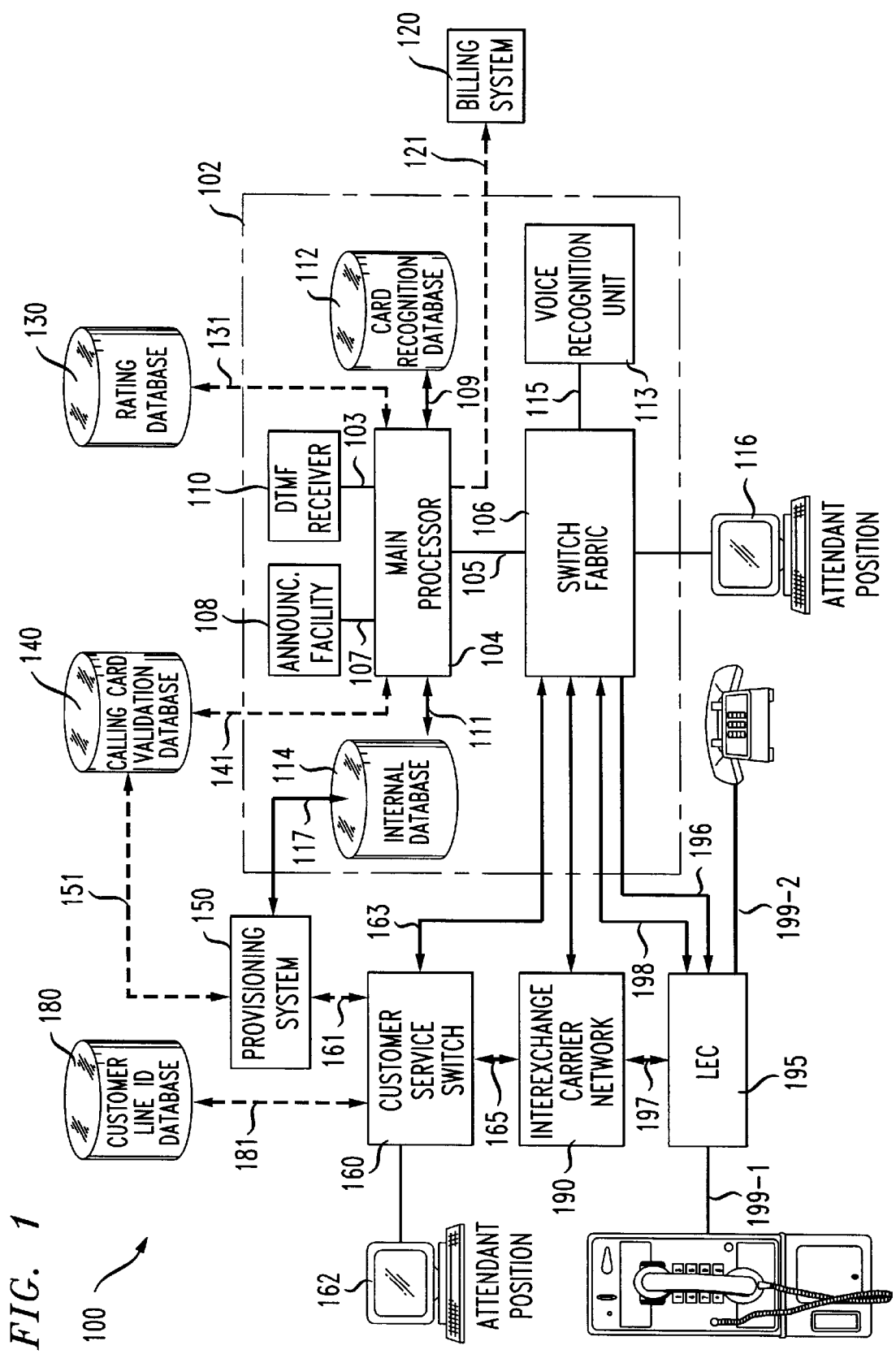
FIG. 1 is a simplified block diagram of a telecommunications network in which the present invention may be practiced.

FIG. 1 shows a preferred embodiment of a telecommunications network in which the present invention may be practiced. Particularly, telecommunications network 100 includes: operator services system (OSS) 102; billing system 120; rating database 130; calling card validation database 140; provisioning system 150; customer service switch 160; customer line identification database 180; inter-exchange network 190; and local exchange carrier (LEC) network 195.

OSS 102 comprises main processor 104 for administering system-wide control functions inter-connected, via system data link 103, to switch fabric 106. Switch fabric 106 serves as an interface between the system and other networks. Also inter-connected to main processor 104, via system data link 105, is announcement facility 108 which stores and issues customized announcements in accordance with the method of the present invention, as described below. Dual tone multi-frequency (DTMF) receiver 110 is inter-connected to processor 104 by data link 107, and is responsible for the reception and processing of a caller's dialed input. Card recognition database 112 communicates with processor 104 over data link 109, and stores a list of calling card vendor identifications. Internal database 114 is accessed by processor 104 via data link 111 for obtaining announcement protocols and generating billing data for transmittal to billing system 120. Attendant position 116 allows a human operator to serve as an interface between a caller and OSS 102, if necessary.

Calling card data is retrieved by OSS 102 from calling card validation database 140 over signaling link 141. Calling card data includes card product-type data which determines announcement protocol and the content of customized announcements to be issued to a caller. Also included in database 140 is card information data which varies according to card product type. An exemplary representation of calling card data which is stored in calling card validation database 140 is described with respect to FIG. 5A below. An representation and description of announcement protocol data is discussed with respect to FIG. 5B.

Card validation database 140 is updated by provisioning system 150 which accesses the database by signaling link 151. Rate information is retrieved from rating database 130 via signaling link 131, and is used by OSS 102 to determine a maximum call duration time for promotional calls. Calling card customers who wish to change their calling card data (e.g. customers who wish to convert a promotional card to a permanent card) interact with a customer representative posted at attendant position 162 of customer service switch 160. Periodically, calling card issuing companies may add pre-established non-billed balances to a card account to promote calling card use. This promotional balance is also entered at the discretion of the card company, by the customer representative into customer service 160. Customer service switch is inter-connected to: OSS 102 via bi-directional trunk 163; inter-exchange carrier network 190 via bi-directional trunk 165; and provisioning system 150 via signaling link 161. Customer service switch 160 also has access to customer line identification database 180 via signaling link 181.

Inter-exchange carrier network 190 receives calling card calls from a switch in a LEC network, such as LEC network 195, over bi-directional trunk 197. Particularly, inter-exchange carrier network 190 is accessed when a caller served by LEC network phone line 199-1 dials a card company's toll-free access number, such as "1-800-555-CALL". Once the call is received in inter-exchange carrier network 190, it is extended over trunk 193 to OSS switch fabric 106. Alternatively, the caller may access switch fabric 106 directly from LEC network 195, via trunk 198, by simply dialing "0" plus a directory number.

Figure 2:
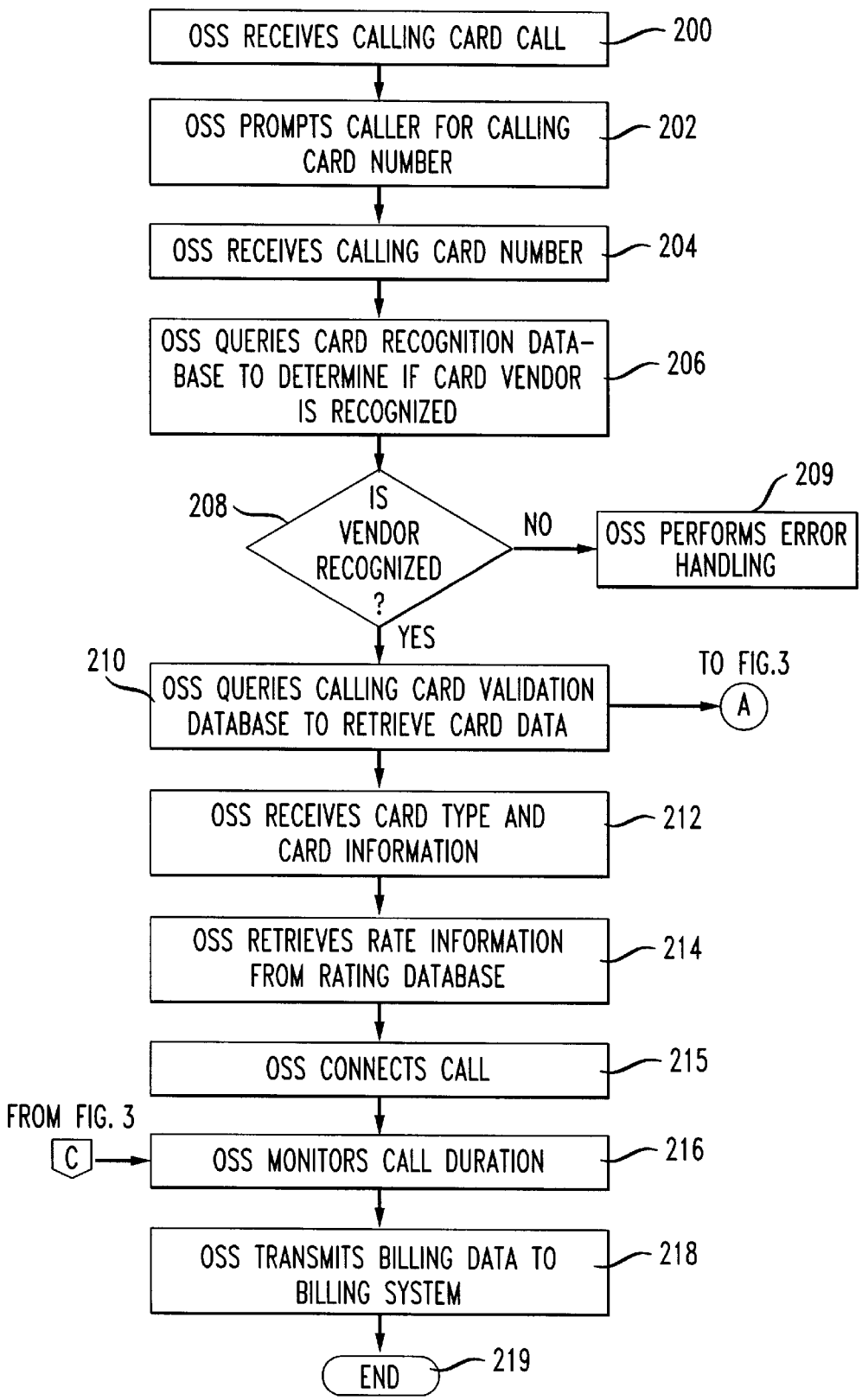
FIGS. 2–4 are flow diagrams of the steps performed in the network of FIG. 1 in accordance with a preferred embodiment of the method of the present invention.
Figure 3:
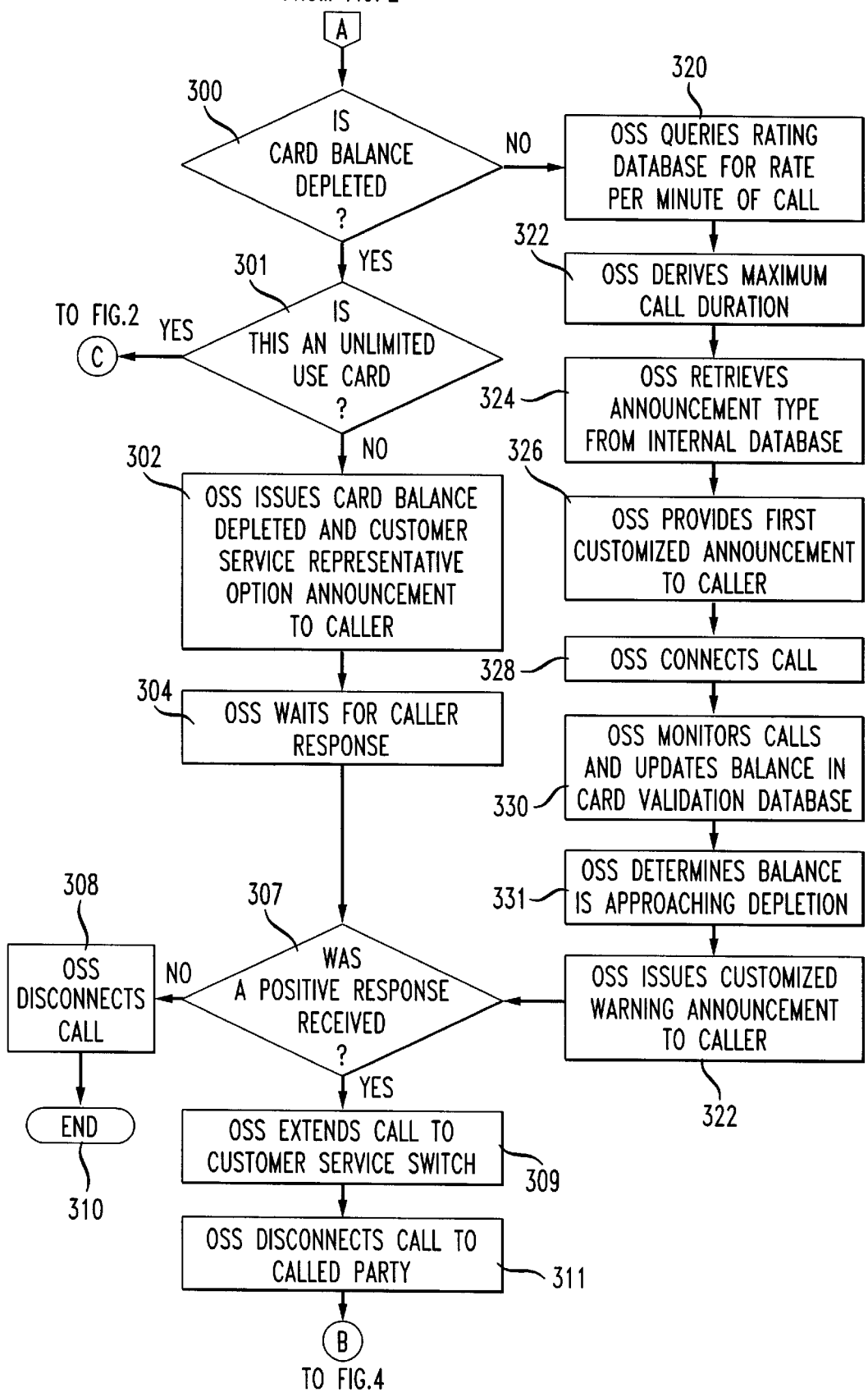
Figure 4:
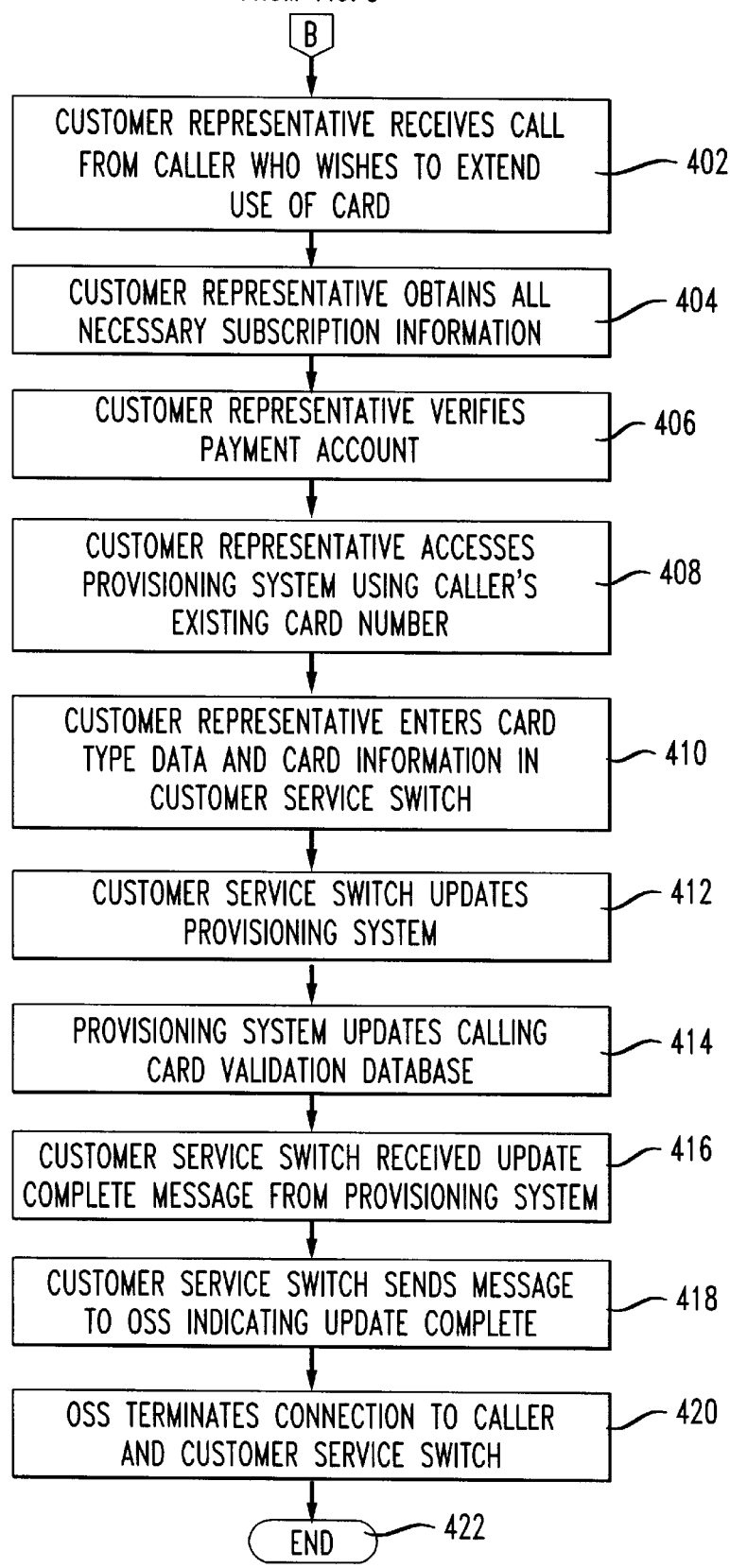

FIGS. 2–4 illustrate the steps performed in telecommunications network 100 during the processing of a calling card call in accordance with a preferred embodiment of the method of the present invention. For purposes of example, assume that a caller, who has access to LEC network 195 via public phone line 199-1, places a call to a called party served by customer line 199-2 of the same LEC network. The caller uses a promotional calling card she received in the mail from the telecommunications company which maintains OSS 102 to pay for the call. Also assume that the caller has been using the promotional card quite liberally, so that the remaining non-billed balance on the card is only $1.20. The caller likes the convenience of the promotional card. She wants to enroll as permanent calling card customer but has not yet contacted the promotional card issuing company to do so. In this example, the caller dials "0" plus the directory number of a called party. The call is extended by LEC network 195 to OSS switch fabric 106 over trunk 198. Alternatively, the caller could have dialed the card company's toll free number "1-800-555-CALL" to access OSS 102 via inter-exchange carrier network 190 as described above.

The call handling process begins in step 200 when OSS switch fabric 106 receives the call from either inter-exchange carrier network 190 or LEC network 195. In step 202, OSS 102 prompts the caller for a calling card number by issuing a distinctive tone or an announcement from announcement facility 108. In step 204, OSS 102 receives the calling card number in DTMF receiver 110. Alternatively, if the caller is unable to provide the calling card number by dialing digits within a pre-determined time period, a human operator at attendant position 116 is connected to the caller by switch fabric 106 so that the calling card number can be retrieved and extended to DTMF receiver 110. The process continues to step 206 in which OSS main processor 104 uses the calling card number it received from DTMF receiver 110 to access calling card recognition database 112. In decision step 208, OSS 102 determines whether the calling card number contains a valid vendor identification (i.e. if the card number corresponds to a recognized vendor) in the database. If the outcome of decision step 208 is a "NO" determination, the process continues to step 209 in which OSS 102 performs error handling, as is known in the art. If the outcome of decision step 208 is a "YES" determination, the process continues to step 210 in which OSS 102 sends a query to calling card validation database 140 over signaling link 141 to request calling card data associated with the card number. In step 212, OSS 102 receives card data, including card product-type data and card information data, from calling card validation database 140. If the card product-type data received from calling card validation database 140 indicates that the card is a permanent or "unlimited use" type card, the process continues to step 214 in which rate information for the call is retrieved from rating database 130. In step 215, the call is connected to the called party at customer line 199-2 via trunk 196. In step 216, OSS 102 monitors the duration of the call, as is known in the art. In step 218, upon completion of the call, OSS 102 transmits billing data for the call to billing system 120 over data link 121 and processing ends in step 219. In this example, however, the card type data indicates that the card is a promotional card. Therefore, the process continues through connector "A" to FIG. 3.

In decision step 300, OSS 102 determines whether card information data received from validation database 140 indicates that the remaining balance of the promotional card has been depleted (i.e. whether the remaining balance equals $0.00). If the outcome of decision step 300 is a "YES" determination, the process continues to decision step 301 in which determination is made as whether the card is an unlimited use card. For example, this situation would occur if the pre-established non-billed balance had been issued by a calling card company as a promotional "bonus" to a loyal permanent card user, and the card user has depleted the balance. If the outcome of decision step 301 is a "YES" decision, the process returns to step 215. If, however, the outcome of decision step 301 is a "NO" determination, the process continues to step 302 in which OSS 102 issues a message from announcement facility 108 which queries the caller to determine whether connection to a customer service representative to arrange for further use of the card is desired. In step 304, OSS waits for a predetermined time period for a response to the query (either a spoken response received at voice recognition facility 113 or, a dialed input received at DTMF facility 110) from the caller. In decision step 307, OSS 102 determines whether a positive response was received from the caller. If the outcome of decision step 307 is a "YES" determination, the process continues to step 309 in which OSS 102 extends the call to customer service switch 160 over trunk 163. In step 311, OSS disconnects the connection to the called party by dropping trunk 196. Further processing continues through connector "B" to FIG. 4, described below. If the outcome of decision step 307 is a "NO" determination, however, the process continues to step 308 in which the call is disconnected by OSS 102 and the process ends in step 310.

In this example, the remaining balance is not $0.00. Therefore, the outcome of decision step 300 is a "NO" determination, and the process continues to step 320 in which OSS 102 accesses rating database 130, via signaling link 131, to determine the per minute billing rate to apply to this particular call. In step 322, OSS processor 104 uses the billing rate and the remaining balance received from validation database 140 to calculate the maximum duration of the call. In step 324, OSS 102 retrieves the announcement protocol from internal database 114. In this call flow example, the announcement protocol includes: issuing a first announcement which informs the caller of the maximum call duration and balance depletion protocol; and issuing a second warning announcement prior to balance depletion which provides the caller with a customer service representative connection option. In step 326, OSS announcement facility 108 issues the first announcement which states "Your remaining balance of $1.20 allows you a maximum call duration of 5 minutes. Upon depletion of the balance, this call will be disconnected." The process continues to step 328 in which OSS switch fabric 106 connects the caller served by line 199-1 to the called party served by line 199-2 LEC network 195 via trunk 196. In step 330, OSS 102 continues to monitor the duration of the call, and periodically updates calling card validation database 140 with a new remaining balance as the call continues. In step 332, at some predetermined remaining balance, (e.g. a remaining balance which allows the call to continue for only 30 seconds) OSS 102 issues the second announcement which states "You have 30 seconds remaining until your existing credit balance is depleted. If you wish to discontinue this call and arrange for further use of your calling card, please press "1". In this example, the caller wishes to convert her promotional card into a permanent calling card. Therefore, in response to the query, the caller depresses the button corresponding to the number "1"on the touch tore telephone which she is using. The process then returns to decision step 307.

FIG. 4 illustrates the steps performed in telecommunications network 100 after OSS 102 has determined that connection to a customer service representative is desired by the caller. In step 400 trunk 196 connection to the called party is dropped and the call is connected to customer service switch 160 via trunk 163. In step 402, a customer service representative receives the call from OSS 102. In step 404, the customer representative answers the call and obtains all necessary information from the caller who wishes to continue to use the calling card number associated with a promotional card. In this case, the caller wants to bill all future charges to her home telephone account corresponding to directory number "708-555-1234". Accordingly, the customer representative obtains from the caller her current calling card number, home directory number and billing address. In step 406, the customer representative verifies the validity of the directory number account by accessing customer line identification database 180, as is known in the art.

In step 408, the customer representative accesses provisioning system 150 via customer service switch 160 using the caller's promotional calling card number. In step 410, the customer representative enters card type data and card information data into customer service switch 160 via attendant position 162. In step 412, customer service switch 160 transmits the new data to provisioning system 150 via signaling link 151. In step 414, provisioning system 150 updates calling card validation database 140 via signaling link 151. In step 416, customer services switch 160 receives an "update complete" message from provisioning system 150. The process continues to step 418 in which customer switch 160 sends a message to OSS 102 indicating that the calling card data update is complete. In step 420, OSS 102 releases trunk 163 to customer service switch 160 and releases trunk connection 195 to the caller. The process ends in step 422.

FIG. 5A shows a representation of data stored in calling card validation database 170 with respect to three distinct calling cards. As shown in the FIG., calling card number "1"is card product-type "A". Accordingly, information stored for this particular calling card account requires remaining balance data which, in this case, is $0.00 as well as balance depletion protocol data which requires all calls made using calling card number "1" to be billed to an account associated with directory number "708-555-1234". Calling card number "2" relates to card product-type "B" which requires remaining balance and balance depletion protocol data. Calling card number "2" has a remaining balance of $5.00 which indicates that the user of this card may continue to place calls. Unlike calling card number "1", however, the balance depletion protocol associated with this particular calling card is to disconnect all calls upon depletion of the remaining balance. Calling card number "3" is a "C" product-type card. The card information data indicates that all calls made using calling card number "3" should be billed to an account associated with directory number "708-555-6457". There is no pre-established non-billed balance associated with calling card number "3".

FIG. 5B is a representation of the announcement protocol data stored in internal database 114. The announcement protocol data is arranged according to card product-type. In operation, OSS 102 retrieves the card product-type data from card validation database 140. Subsequently, OSS 102 accesses internal database 114 to obtain the appropriate announcement protocol associated with the product-type. As shown in the FIG., card product-type "A" requires two distinct announcements. The first announcement issued provides maximum call duration, remaining balance information and the balance depletion protocol to the caller. A second announcement issues an alert tone followed by a warning that the specified directory number account will be billed upon balance depletion. Card product-type "B" is also associated with two distinct announcements. Similar to card product-type "A", the first announcement protocol provides the maximum call duration, remaining balance and balance depletion protocol to the caller. Subsequently, a second announcement comprising an alert tone, warning of impending disconnect and an offer to connect the caller to a customer representative is issued. Card product-type "C" is associated with only one announcement which prompts the caller for a calling card number upon receipt of the call in OSS 102.

The present invention achieves advantages over the prior art in that calling card users who receive promotional calling cards may automatically convert the promotional card into a permanent calling card so that a new calling card number need not be assigned. Further, calling card issuing companies can reward loyal permanent calling card users by authorizing pre-established non-billed balances which do not require memorization of a new calling card number by the customer. It is understood that the above-described embodiment is for illustrative purposes only. Numerous other arrangements may be devised by those skilled in the art without departing from the scope of the invention.

The invention claimed is:

1. In a telecommunications network comprising an operator services system (OSS) interconnected to a calling card validation database, wherein the OSS receives calling card calls, a method for establishing flexible calling card billing arrangements comprises:

receiving a call in the OSS;

the OSS prompting a caller for a calling card number;

retrieving card product-type data and card information associated with the calling card number from the calling card validation database, wherein card product-type data includes a promotional calling card and a permanent calling card, and the card information includes a balance depletion protocol for the promotional calling card and a directory number account for the permanent calling card;

determining whether a conversion of the calling card number from the promotional calling card to the permanent calling card is desired;

converting the calling card number to the permanent calling card by receiving and storing the directory number account and changing the balance depletion protocol; and issuing customized announcements in accordance with the product-type card information retrieved from the card validation database.

2. The method of claim 1 wherein retrieving card product-type data from the card validation database comprises the step of:

retrieving information indicating that the calling card is the promotional calling card.

3. The method of claim 1 wherein the step of receiving card information from the card validation database comprises the step of:

receiving remaining balance information; and receiving the balance depletion protocol.

4. The method of claim 1 wherein providing customized announcements comprises the step of:

issuing a first announcement to the caller quoting the remaining call duration time based on balance; and subsequently issuing a second announcement to the caller indicating the balance depletion protocol.

5. The method of claim 1 and further comprising the OSS interacting with a rating database to determine maximum duration of the call.

6. In a telecommunications network comprising an operator services system (OSS) interconnected to a card validation database, wherein the OSS receives calling card calls, a method for converting a promotional calling card into a permanent calling card comprises the steps of:

receiving a call from a LEC network in the OSS, wherein the call is made using a promotional calling card number;

the OSS using the promotional calling card number to retrieve remaining balance information from the card validation database;

responsive to receiving the remaining balance information from the card validation database, the OSS determining that the remaining balance has been depleted;

the OSS querying the caller to determine if conversion of the promotional calling card to the permanent calling card is desired wherein the promotional calling card includes a balance depletion protocol;

responsive to receiving a positive response from the caller, the OSS converting the promotional calling card to the permanent calling card by receiving and storing a directory number account and changing the balance depletion protocol.

7. A telecommunications network comprises:

an operator services system (OSS) interconnected to a telephone network;

a card validation database interconnected to the OSS for validating a calling card issued by a calling card company;

a rating database interconnected to the OSS for determining maximum duration of a call placed by a caller using the calling card;

a provisioning system interconnected to the card validation database for updating a calling card type and a calling card information for a particular calling card in the card validation database, wherein the calling card type includes a promotional calling card and a permanent calling card, and the calling card information includes a balance depletion protocol for the promotional calling card and a directory number account for the permanent calling card;

wherein said provisioning system updates the calling card type from the promotional card to the permanent calling card by receiving and storing a directory number account and changing the balance depletion protocol.

8. The method of claim 1, wherein the balance depletion protocol for the promotional calling card comprises disconnecting the call when a balance is depleted.

9. The method of claim 8, wherein the step of converting the calling card number comprises changing the balance depletion protocol to billing the call to the directory account number when the balance is depleted.

* * * * *

UNITED STATES PATENT AND TRADEMARK OFFICE
CERTIFICATE OF CORRECTION

PATENT NO. : 5,864,609
DATED : January 26, 1999
INVENTOR(S) : Cross, et al

It is certified that error appears in the above-identified patent and that said Letters Patent is hereby corrected as shown below:

On the title page, item [75], "Nasrin Hoque, Mapawan, N.J." should read – Nasrin Hoque, Matawan, N.J. --; and "Kathryn Ann Jurie" should read -- Kathryn Ann Juric --

Signed and Sealed this

Twenty-third Day of November, 1999

*Attest:*

Q. TODD DICKINSON

*Attesting Officer*   *Acting Commissioner of Patents and Trademarks*